United States Patent
Cohen et al.

(10) Patent No.: US 12,452,170 B2
(45) Date of Patent: Oct. 21, 2025

(54) SYSTEM AND METHOD FOR TRANSMITTING A DATA PACKET

(71) Applicant: HUAWEI TECHNOLOGIES CO., LTD., Shenzhen (CN)

(72) Inventors: Reuven Cohen, Hod Hasharon (IL); Ben-Shahar Belkar, Hod Hasharon (IL); Tal Mizrahi, Hod Hasharon (IL)

(73) Assignee: Huawei Technologies Co., Ltd., Shenzhen (CN)

( * ) Notice: Subject to any disclaimer, the term of this patent is extended or adjusted under 35 U.S.C. 154(b) by 93 days.

(21) Appl. No.: 18/457,022

(22) Filed: Aug. 28, 2023

(65) Prior Publication Data

US 2023/0412505 A1  Dec. 21, 2023

Related U.S. Application Data

(63) Continuation of application No. PCT/EP2021/055597, filed on Mar. 5, 2021.

(51) Int. Cl.
*H04L 45/74* (2022.01)
*H04L 45/00* (2022.01)

(52) U.S. Cl.
CPC ............ *H04L 45/742* (2013.01); *H04L 45/22* (2013.01); *H04L 45/566* (2013.01)

(58) Field of Classification Search
CPC ... H04L 45/742; H04L 47/2441; H04L 45/22; H04L 45/566; H04L 47/24; H04L 47/2483
See application file for complete search history.

(56) References Cited

U.S. PATENT DOCUMENTS 5,008,882 A * 4/1991 Peterson ........... G06F 15/17368
370/408
6,041,038 A * 3/2000 Aimoto ............... H04L 49/3081
370/395.21
6,967,924 B1 * 11/2005 Aimoto ............... H04L 49/3081
370/235

(Continued)

FOREIGN PATENT DOCUMENTS

WO  2018125135 A1  7/2018

OTHER PUBLICATIONS

He et al., "Presto: Edge-based Load Balancing for Fast Datacenter Networks," ACM SIGCOMM '15 Computer Communication Review, vol. 45, Issue 4, Total 14 pages (Aug. 17-21, 2015).

(Continued)

*Primary Examiner* — Chris Parry
*Assistant Examiner* — Hassan Abdur-Rahman Khan
(74) *Attorney, Agent, or Firm* — Leydig, Voit & Mayer, Ltd.

(57) ABSTRACT

A method for data transmission over a network and a related device are provided. The method includes generating, by a sending device a data packet for transmission, wherein a header of the data packet includes a routing hint field indicating a status of the data packet, and wherein the status is selected from a status list including a normal packet, a first packet in a heavy flow, wherein the heavy flow is a data flow having more than a predefined number of packets transmitted during a predefined period of time, and a last packet in the heavy flow. The method further includes transmitting, by the sending device, the data packet to a destination address over the network.

20 Claims, 6 Drawing Sheets

(56) References Cited

U.S. PATENT DOCUMENTS

| | | | | |
|---|---|---|---|---|
| 2002/0071302 A1* | 6/2002 | Kawasumi | ............... | G11C 7/06 365/63 |
| 2003/0202406 A1* | 10/2003 | Issa | ...................... | G11C 7/1006 365/200 |
| 2005/0152354 A1* | 7/2005 | Abel | ................... | H04L 67/1001 370/389 |
| 2006/0018329 A1* | 1/2006 | Nielsen | ................... | H04L 49/70 370/401 |
| 2007/0263423 A1* | 11/2007 | Scheuerlein | ............. | G11C 7/18 365/63 |
| 2008/0263386 A1* | 10/2008 | Darrington | ........... | G06F 11/203 714/4.11 |
| 2009/0147793 A1* | 6/2009 | Hayakawa | .............. | H04L 45/04 370/401 |
| 2009/0238068 A1* | 9/2009 | DeCusatis | ............. | H04L 47/263 370/229 |
| 2009/0291522 A1* | 11/2009 | Oh | ......................... | H10B 63/10 438/102 |
| 2012/0265856 A1* | 10/2012 | Major | .............. | H04N 21/64753 709/219 |
| 2012/0314408 A1* | 12/2012 | Reimann | ................. | F21L 4/005 362/208 |
| 2013/0182567 A1* | 7/2013 | Scheffenegger | ........ | H04L 47/34 370/231 |
| 2014/0092738 A1* | 4/2014 | Grandhi | ................ | H04W 28/02 370/235 |
| 2016/0050653 A1* | 2/2016 | Rastogi | ................ | H04W 24/08 455/453 |
| 2016/0261665 A1* | 9/2016 | Stockhammer | ......... | H04L 65/65 |
| 2017/0180261 A1* | 6/2017 | Ma | .......................... | H04L 47/12 |
| 2017/0346687 A1* | 11/2017 | Piecuch | .................. | H04L 49/90 |
| 2019/0253341 A1* | 8/2019 | Timmons | .............. | H04L 45/123 |
| 2019/0386924 A1* | 12/2019 | Srinivasan | ............ | H04L 47/122 |
| 2022/0070062 A1* | 3/2022 | MeLampy | .............. | H04L 45/74 |
| 2023/0403233 A1* | 12/2023 | Rahman | .............. | H04L 49/9047 |
| 2023/0412505 A1* | 12/2023 | Cohen | ................. | H04L 47/2483 |

OTHER PUBLICATIONS

Alizadeh et al., "CONGA: Distributed Congestion-aware Load Balancing for Datacenters," ACM SIGCOMM '14 Computer Communication Review, vol. 44, Issue 4, Total 12 pages (Aug. 17-22, 2014).

Cao et al., "Per-packet Load-balanced, Low-latency Routing for Clos-based Data Center Networks," CoNEXT '13: Proceedings of the ninth ACM conference on Emerging networking experiments and technologies, Total 12 pages (Dec. 9-12, 2013).

Dixit et al., "On the Impact of Packet Spraying in Data Center Networks," 2013 Proceedings IEEE Infocom, Total 9 pages (Apr. 2013).

Al-Fares et al., "Hedera: Dynamic Flow Scheduling for Data Center Networks," NSDI'10: Proceedings of the 7th USENIX conference on Networked systems design and implementation, Total 15 pages (Apr. 2010).

\* cited by examiner

GENERATING, BY A SENDING DEVICE, A DATA PACKET FOR TRANSMISSION, WHERE A HEADER OF THE DATA PACKET INCLUDES A ROUTING HINT FIELD INDICATING A STATUS OF THE DATA PACKET, AND WHERE THE STATUS IS SELECTED FROM A STATUS LIST INCLUDING A NORMAL PACKET, A FIRST PACKET IN A HEAVY FLOW, WHERE THE HEAVY FLOW IS A DATA FLOW HAVING MORE THAN A PREDEFINED NUMBER OF PACKETS TRANSMITTED DURING A PREDEFINED PERIOD OF TIME, AND A LAST PACKET IN THE HEAVY FLOW
502

TRANSMITTING, BY THE SENDING DEVICE, THE DATA PACKET TO A DESTINATION ADDRESS OVER THE NETWORK
504

SYSTEM AND METHOD FOR TRANSMITTING A DATA PACKET

CROSS-REFERENCE TO RELATED APPLICATIONS

This application is a continuation of International Application No. PCT/EP2021/055597, filed on Mar. 5, 2021, the disclosure of which is hereby incorporated by reference in its entirety.

TECHNICAL FIELD

Embodiments of the disclosure relates to a computer-implemented method for data transmission over a network, and more particularly, embodiments of the disclosure relate to a sending device for transmitting a data packet over the network. Moreover, embodiments of the disclosure also relate to a system for transmitting the data packet over the network.

BACKGROUND

In a data network, traffic load balancing refers to efficiently distributing incoming traffic across the network. In a data center network, the traffic load balancing plays an effective role in efficiently routing data packets resulting in better performance of the data center network. The traffic load balancing further ensures that the server is optimally worked and thus, maximizes speed and capacity utilization of the data center network. An important concept for traffic load balancing is based on equal cost multiple paths (ECMP). As is well known, ECMP allows network multiplexers in the network to choose any shortest path leading to a destination address for routing of the data packets and hence supports load balancing while avoiding possible routing loops To prevent packets belonging to the same flow from being received out of order, network multiplexers try to send all the packets of the same flow over the same path.

When in a network there is a possible long continuous flow of data ("elephant flow" or "heavy flow"), the ECMP concept may allow network multiplexers to choose a single path for routing data packets of more than one heavy flow resulting in the likely dropping of many data packets due to congestion in the path. In such scenarios, it is useful for a network multiplexer to identify data heavy flows, for example, by implementing a hardware logic approach, in order to decide on a different flow route for different heavy flows. In other examples, it is beneficial to assign heavy flows to a different queue, separate from non-heavy flows, in order to prevent them from delaying short-and-time-sensitive flows.

However, existing approaches for identifying heavy flows are limited. A hardware logic approach to identifying heavy flows may require counting the number of packets received for each flow, and maintain per-flow statistics. This hardware logic approach is expensive and a long-time may elapse before an active flow is detected as a heavy flow.

Therefore, there arises a need to address the aforementioned technical drawbacks in existing systems or technologies in providing efficient routing for long continuous data.

SUMMARY

It is an object of the disclosure to provide a computer-implemented method for data transmission over a network, a sending device for transmitting a data packet over the network, and a system for transmitting the data packet over the network while avoiding one or more disadvantages of prior art approaches.

This object is achieved by the features of the independent claims. Further implementation forms are apparent from the dependent claims, the description, and the figures.

The disclosure provides a computer-implemented method for data transmission over a network, a sending device for transmitting a data packet over the network, and a system for transmitting the data packet over the network.

According to a first aspect, there is provided a computer-implemented method for data transmission over a network. The computer-implemented method includes generating, by a sending device, a data packet for transmission, where a header of the data packet includes a routing hint field indicating a status of the data packet, and where the status is selected from a status list comprising a normal packet, a first packet in a heavy flow, and a last packet in the heavy flow, where the heavy flow is a data flow having more than a predefined number of packets transmitted during a predefined period of time. The computer-implemented method further includes transmitting, by the sending device, the data packet to a destination address over the network.

The computer-implemented method learns about a heavy flow using the routing hint field and provides a routing and/or buffering (queueing) decision for the heavy flow, thereby improving the performance of the network by utilizing available resources efficiently. The computer-implemented method enables to improve network performance.

Optionally, the status list further includes an independent packet, where the independent packet is not part of a data flow.

The independent packet of the status list is identified by the sending device. The sending device may assign a routing hint field for the independent packet. The network multiplexer can determine a current least short path and/or least occupied queue for the independent packet.

Optionally, the routing hint field includes a two-bit code configured to indicate one of four statuses.

A value of the two-bit code is configured to indicate the status of the packet. The two-bit code provides a hint on the type of data packets including a hint about start and endpoint of a heavy flow. Also, the two-bit code guides about recommended routing and/or queueing to the network multiplexer.

Optionally, the routing hint field includes a three-bit code, and the status list includes one or more additional statuses indicating a length of the heavy flow.

The computer-implemented method implements the routing and/or queueing decision based on the length of the heavy flow. The length of the heavy flow in combination with the type of data flow may be used in determining how to handle the packet with respect to queueing and routing in a data transmission network.

Optionally, transmitting includes re-routing the data packet using a network multiplexer by, (i) receiving, by the network multiplexer, the data packet from the sending device, (ii) checking, by the network multiplexer, the routing field of the data packet, and (iii) transmitting, by the network multiplexer, the data packet based on the routing status.

Optionally, transmitting the data packet by the network multiplexer includes, if the data packet is a normal packet, checking a routing cache to determine if there is a routing entry for a flow corresponding to the data packet. If the routing cache includes a routing entry for the flow, the data packet is transmitted based on the routing entry. If the routing cache does not include a routing entry for the flow, the data packet is transmitted based on a default path in an equal cost multiple paths, ECMP table. If the data packet is the first packet in a heavy flow, it is determined whether to transmit the data packet based on the default path in the ECMP table or based on an alternative path in the ECMP table and, if the data packet is transmitted based on the alternative path in the ECMP table, a new entry is created for the heavy flow in the routing cache. If the data packet is the last packet in the heavy flow, a corresponding entry is deleted for the heavy flow in the routing cache.

Based on the type of data flow, a value of the routing hint field is assigned, thereby a routing technique is decided by the network multiplexer to transmit the data. The network multiplexer determines whether the data flow to route over to its default port or over another port using the routing hint field, thereby port utilization is done intelligently even in case of the heavy flow of the data packets.

Optionally, if the data packet is an independent packet which is not part of a data flow, transmitting the data packet by the network multiplexer includes determining a current least used path and transmitting the data packet based on the determination.

According to a second aspect, there is provided a computer-readable medium that includes instructions which, when executed by a processor, cause the processor to execute the method.

According to a third aspect, there is provided a sending device for transmitting a data packet over a network. The sending device is configured to generate a data packet for transmission, where a header of the data packet includes a routing hint field indicating a status of the data packet. The status is selected from a status list including (i) a normal packet, (ii) a first packet in a heavy flow, where the heavy flow is a data flow having more than a predefined number of packets transmitted during a predefined period of time, and (iii) a last packet in the heavy flow. The sending device is configured to transmit the data packet to a destination address over the network.

The sending device learns about the type data flow using the routing hint field and provides a routing decision in order to route such heavy flow, thereby improving the performance of the network by utilizing available resources efficiently. Also, the sending device enables to improve speed of data transmission along with bandwidth utilization.

Optionally, the status list further includes an independent packet, where the independent packet is not part of a data flow.

Optionally, the routing hint field includes a two-bit code configured to indicate one of four routing statuses.

Optionally, the routing hint field includes a three-bit code, and wherein the status list includes one or more additional statuses indicating a length of the heavy flow.

Optionally, the sending device includes a network interface card, or the sending device is implemented as a kernel or application on a processing apparatus.

According to a fourth aspect, there is provided a system for transmitting a data packet over a network. The system includes a sending device and a network multiplexer. The network multiplexer is configured to receive the data packet from the sending device. The network multiplexer is configured to check the routing hint field of the data packet. The network multiplexer is configured to transmit the data packet based on the status.

The system improves efficacy in network utilization and port utilization. The value of the routing hint field hints the network multiplexer based on the type of data flow. The network multiplexer determines in what queue to place the packets of the data flow and whether to route the data flow over its default port or over another port, thereby, resource utilization is done intelligently based on the type of the data flow.

Optionally, transmitting the data packet by the network multiplexer includes, if the data packet is a normal packet, a routing cache is checked to determine if there is a routing entry for a flow corresponding to the data packet. If the routing cache includes a routing entry for the flow, the data packet is transmitted based on the routing entry. If the routing cache does not include a routing entry for the flow, the data packet is transmitted based on a default path in an equal cost multiple paths, ECMP table. If the data packet is the first packet in a heavy flow, it is determined whether to transmit the data packet based on the default path in the ECMP table or based on an alternative path in the ECMP table. If the data packet is transmitted based on the alternative path in the ECMP table, a new entry is created for the heavy flow in the routing cache. If the data packet is the last packet in a heavy flow, a corresponding entry is deleted for the heavy flow in the routing cache.

Optionally, if the packet is an independent packet which is not part of a data flow, transmitting the data packet by the network multiplexer includes determining a current least used shortest path and transmitting the data packet based on the determination.

A technical problem in the prior art is resolved, where the technical problem concerns efficient traffic load balancing of heavy data flows, knowledge of network topology, and a load imposed on each interface of the network multiplexer by the sending device, expensive network multiplexer in identifying heavy data flows.

Therefore, in contradistinction to the prior art, according to the computer-implemented method, the computer-readable medium, the sending device, and the system for transmitting a data packet over a network. The computer-implemented method, the computer-readable medium, the sending device, and the system can improve performance of a data center, by utilizing available resources in an efficient manner. The computer-implemented method, the computer-readable medium, the sending device, and the system utilize information available on network interface card (NIC) in regard to a type of the data flow, thereby the network multiplexer assists the NIC to operate in a more efficient manner. Thus, an efficient way of routing technique is implemented based on the routing hint provided by the sender. The computer-implemented method, the computer-readable medium, the sending device, and the system can be used by smart NIC and switches, even on current generation switches using programmability.

These and other aspects of the disclosure will be apparent from and the implementation(s) described below.

BRIEF DESCRIPTION OF DRAWINGS

Implementations of the disclosure will now be described, by way of example only, with reference to the accompanying drawings, in which.

DETAILED DESCRIPTION OF THE DRAWINGS

Implementations of the disclosure provide a computer-implemented method for data transmission over a network, a sending device for transmitting a data packet over the network, and a system for transmitting the data packet over the network.

To make solutions of the disclosure more comprehensible for a person skilled in the art, the following implementations of the disclosure are described with reference to the accompanying drawings.

Terms such as "a first", "a second", "a third", and "a fourth" (if any) in the summary, claims, and foregoing accompanying drawings of the disclosure are used to distinguish between similar objects and are not necessarily used to describe a specific sequence or order. It should be understood that the terms so used are interchangeable under appropriate circumstances, so that the implementations of the disclosure described herein are, for example, capable of being implemented in sequences other than the sequences illustrated or described herein. Furthermore, the terms "include" and "have" and any variations thereof, are intended to cover a non-exclusive inclusion. For example, a process, a method, a system, a product, or a device that includes a series of steps or units, is not necessarily limited to expressly listed steps or units but may include other steps or units that are not expressly listed or that are inherent to such process, method, product, or device.

Figure 1:
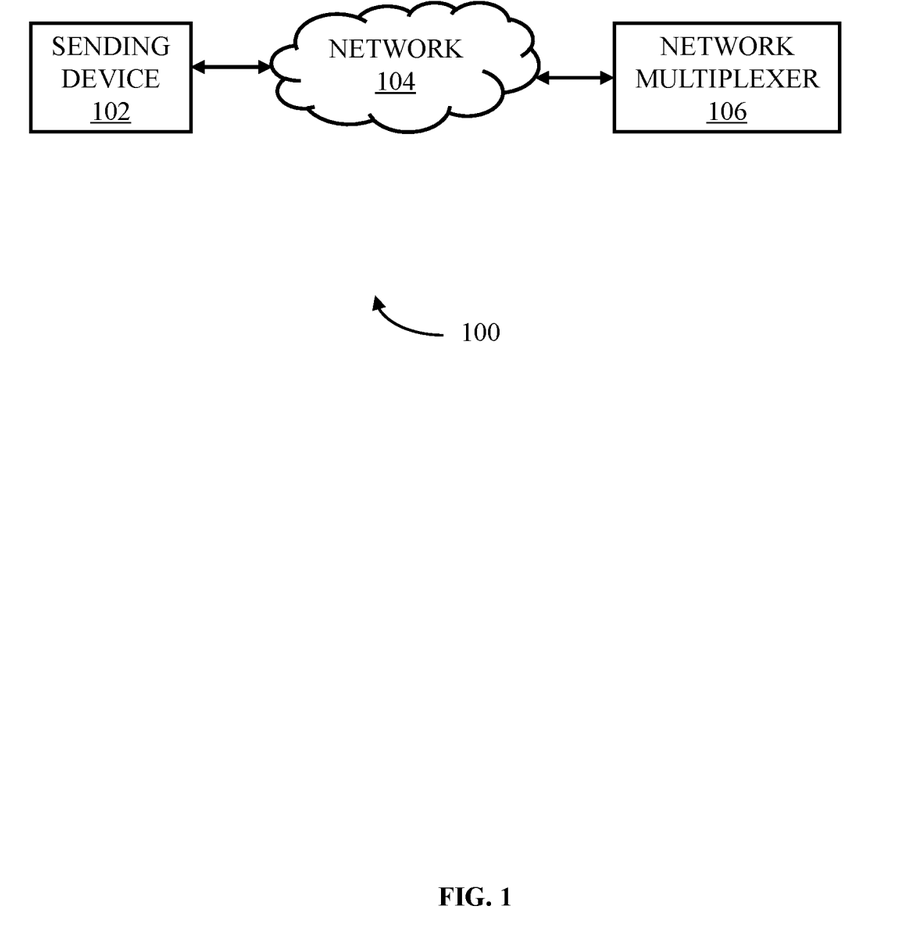
FIG. 1 is a block diagram of a system for transmitting a data packet over a network in accordance with an implementation of the disclosure.

FIG. 1 is a block diagram of a system 100 for transmitting a data packet over a network 104 in accordance with an implementation of the disclosure. The system 100 includes a sending device 102, and a network multiplexer 106. The sending device 102 is configured to generate a data packet for transmission. The data packet includes a header that includes a routing hint field indicating a status of the data packet. The status of the data packet is selected from a status list including a normal packet, a first packet in a heavy flow, and a last packet in the heavy flow. The heavy flow is a data flow having more than a predefined number of data packets transmitted during a predefined period of time. The sending device 102 configured to transmit the data packet to a destination address over the network 104. The network multiplexer 106 is configured to (i) receive the data packet from the sending device 102, (ii) check the routing hint field of the data packet and (iii) transmit the data packet based on the status.

The network multiplexer 106 learns about the heavy flow using the routing hint field and make a routing and/or queueing decision to route such heavy flow, thereby improving the performance of the network 104 by utilizing available resources efficiently. The system 100 enables to improve bandwidth utilization of the network 104.

Optionally, the status list further includes an independent packet, where the independent packet is not part of a data flow.

The routing hint field may include a two-bit code configured to indicate one of four statuses. Optionally, the four statuses of the data packet are any of 00, 01, 10, 11. The routing hint field may include a three-bit code and the status list includes one or more additional statuses that indicate a length of the heavy flow.

The sending device 102 may include, without limitation, a network interface card, or the sending device 102 is implemented as a kernel or application on a processing apparatus.

Optionally, if the data packet is a normal packet, the network multiplexer 106 checks a routing cache to determine if there is a routing entry for a flow corresponding to the data packet. If the routing cache includes a routing entry for the flow, the network multiplexer 106 may transmit the data packet based on the routing entry. If the routing cache does not include a routing entry for the flow, the network multiplexer 106 may transmit the data packet based on a default path taken, for example, from an equal cost multiple paths, ECMP, table.

If the data packet is the first packet in a heavy flow, the network multiplexer 106 may determine whether to transmit the data packet based on the default path or based on an alternative path. If the data packet is transmitted based on the alternative path, the network multiplexer 106 may create a new entry for the heavy flow in the routing cache. If the data packet is the last packet in the heavy flow, the network multiplexer 106 may delete any corresponding entry for the heavy flow in the routing cache.

Optionally, the network multiplexer 106 determines a current least used shortest path and transmitting the data packet based on the determination if the packet is an independent packet which is not part of a data flow. The network multiplexer 106, without limitation, may be selected from a router, a hardware/programmable switch including a high-speed programmable switch.

The sending device 102 knows a role of the data packet in a data flow. For example, when the sending device 102 is a network interface card, NIC, that uses remote direct access memory (RDMA), the sending device 102 knows whether the flow of the data packet may be routed over a reliable connection or a non-reliable connection. When the sending device 102 is a host, the sending device 102 knows whether the flow of the data packet is a transmission control protocol, TCP or a user datagram protocol, UDP. For the reliable RDMA connection, or the TCP, the sending device 102 knows if this packet is an acknowledgment, ACK, a regular packet or a retransmitted packet.

Figure 2:
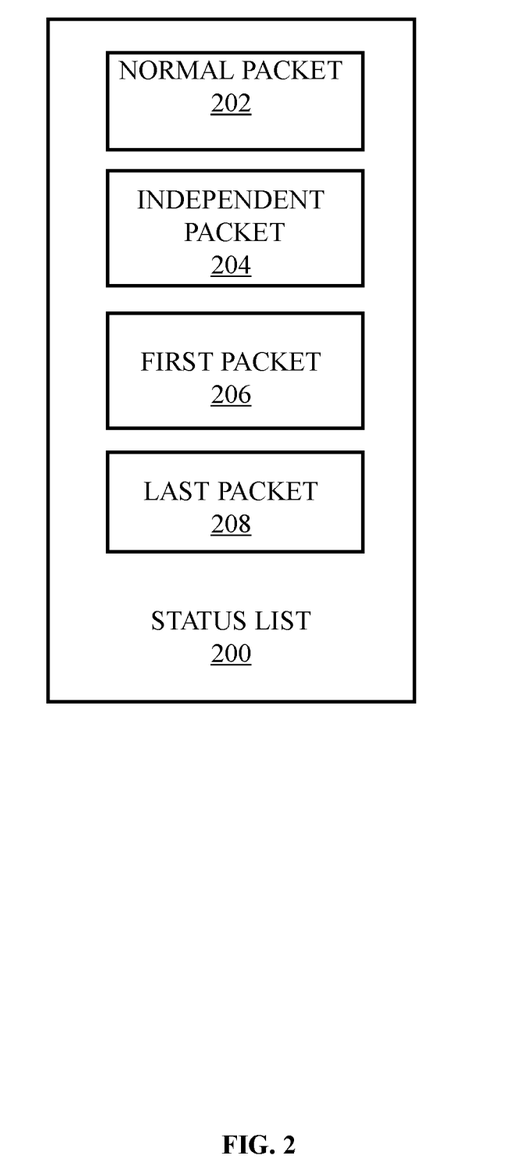
FIG. 2 is an exemplary block diagram that illustrates a status list in accordance with an implementation of the disclosure.

FIG. 2 is an exemplary block diagram that illustrates a status list 200 in accordance with an implementation of the disclosure. The status list 200 includes a normal packet 202, an independent packet 204, a first packet 206 in a heavy flow, and a last packet 208 in the heavy flow. The heavy flow is a data flow having more than a predefined number of packets transmitted during a predefined period of time. The normal packet 202 may be transmitted using a standard (i.e. regular) switch routing algorithm and include a corresponding value in a routing hint field to indicate a corresponding status. The normal packet 202 may include a value "00" as the routing hint field. Optionally, a network multiplexer checks the routing hint field of a data packet. The network multiplexer is further enabled to check a routing cache to determine if there is a routing entry for a flow corresponding to the data packet. Each routing entry may hold an identification number to the data flow, for example, "flowid". In addition, each routing entry includes an interface for transmitting the normal packet 202. Thus, if the normal packet 202 to the data flow that appears in the routing cache or routing table, routing is performed according to the path indicating by the corresponding entry.

The independent packet 204 includes a corresponding value in the routing hint field to indicate a corresponding status. The independent packet 204 includes a value "01" as the routing hint field. A current least used the shortest path is determined by the network multiplexer. The data packet is transmitted based on a determined used shortest path. Optionally, the network multiplexer routes the data packet using at least one of (i) a standard routing technique, or (ii) a random routing using ECMP table, or (iii) at least loaded out port. Examples of packets that may be labelled as an independent packet 204 may include selective acknowledgment data packet(s) (SACKs), acknowledgment data packet(s) (ACKs), Negative acknowledgment data packets (NACKs), data packet(s) of short RDMA.

The first packet 206 in the heavy flow includes a value "10" as the routing hint field. The network multiplexer checks the routing hint field of the data packet. If the data packet is the first packet 206, the network multiplexer determines whether to transmit the data packet based on the default path or based on an alternative path. As each routing entry may hold an identification number to the data flow, for example, "flowid" in the routing cache, the "flowid" does not appear in the routing cache in case of the first packet 206. If the network multiplexer transmits the data packet based on a non-default path, a corresponding data entry in the routing cache is created to indicate a corresponding alternate path for transmitting the data packet. The heavy flow is a data flow having more than a predefined number of data packets transmitted during a predefined period of time.

Based on a type of data flow, the value of the routing hint field is assigned, as described in detail above with respect to the normal packet 202, the independent packet 204, the first packet 206 in the heavy flow, and the last packet 208 in the heavy flow. In addition to the routing technique being decided based on the value of the routing hint field, when the type of data flow indicates (for example, on receiving a data packet with "10" in the routing hint field) a heavy flow, the network multiplexer selects the data buffer (queue) and/or the data port (default or alternative) on which to route the data flow. Accordingly, intelligent selection and usage of (data) ports and queues may be achieved in the case of the heavy flow.

Figure 3:
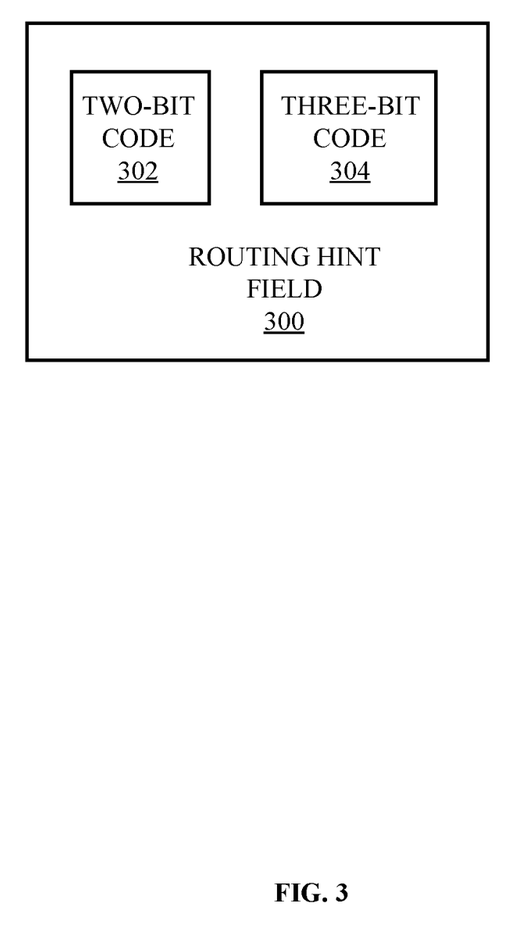
FIG. 3 is an exemplary block diagram of a routing hint field in a data packet in accordance with an implementation of the disclosure.

FIG. 3 is an exemplary block diagram of a routing hint field 300 in a data packet in accordance with an implementation of the disclosure. The routing hint field 300 indicates a status of the data packet and the status is selected from a status list. The routing hint field 300 includes a two-bit code 302 and a three-bit code 304. The two-bit code 302 configured to indicate one of four statuses. The four statuses of the data packet may be 00, 01, 10, or 11. A value of the two-bit code 302 is assigned by a sending device. The value of the two-bit code 302 may be used by a network multiplexer. The two-bit code 302 provides a hint about start and end point of a heavy flow. The two-bit field 302 guides about recommended routing and/or queueing (buffering) approach to the network multiplexer. The status list includes one or more additional statuses that indicate a length of the heavy flow. The length may be indicated in actual size. If the length may require more bytes of size, then the length may use a new header.

Figure 4:
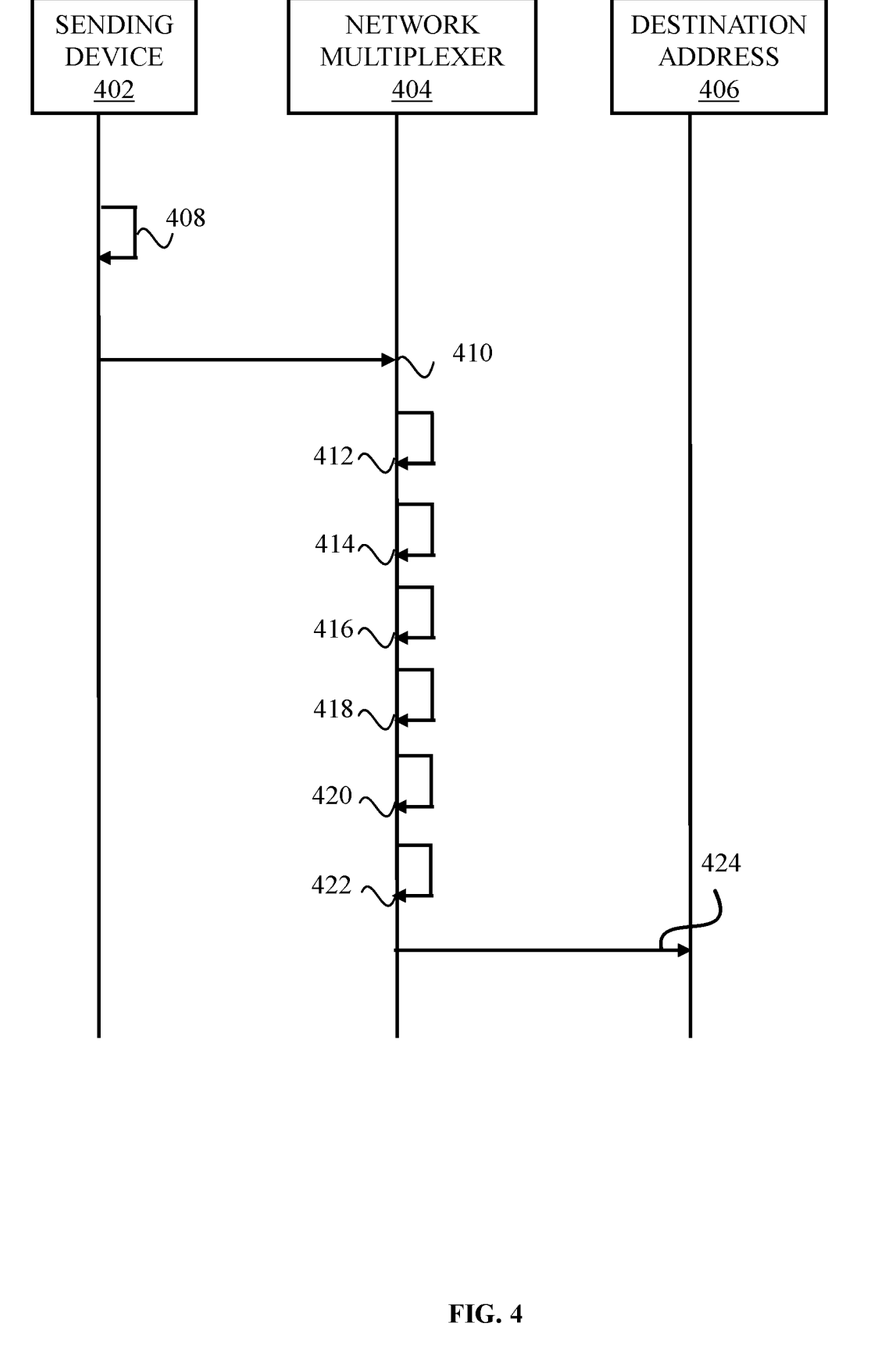
FIG. 4 is an interaction diagram of a method for transmitting a data packet by a sending device in accordance with an implementation of the disclosure.

FIG. 4 is an interaction diagram of a method for transmitting a data packet by a sending device 402 in accordance with an implementation of the disclosure. At a step 408, a data packet is generated by the sending device 402 for transmission. The data packet includes a header that includes a routing hint field indicating a status of corresponding data packet. The status is selected from a status list including a normal packet, a first packet in a heavy flow, where the heavy flow is a data flow having more than a predefined number of packets transmitted during a predefined period of time, and a last packet in the heavy flow. At a step 410, the data packet is received from the sending device 402 by a network multiplexer 404. At a step 412, the routing hint field of the data packet is checked by the network multiplexer 404. At a step 414, if the data packet is the normal packet, a routing cache is checked to determine if there is a routing entry for a flow corresponding to the data packet, by the network multiplexer 404. At a step 416, the data packet is transmitted by the network multiplexer 404 based on the routing entry when the routing cache includes a routing entry for the flow. At a step 418, the data packet is transmitted based on a default path in an equal cost multiple paths, ECMP table by the network multiplexer 404 if the routing cache does not include a routing entry for the flow. At a step 420, it is determined whether to transmit the data packet based on the default path or based on an alternative path. If the data packet is transmitted based on the alternative path, a corresponding new entry for the heavy flow is added (created) into the routing cache, by the network multiplexer 404. At a step 422, a corresponding entry is deleted for the heavy flow in the routing cache by the network multiplexer 404, if the data packet is the last packet in the heavy flow. At a step 424, the data packet is transmitted to a destination address 406 based on the status, by the network multiplexer 404.

Figure 5:
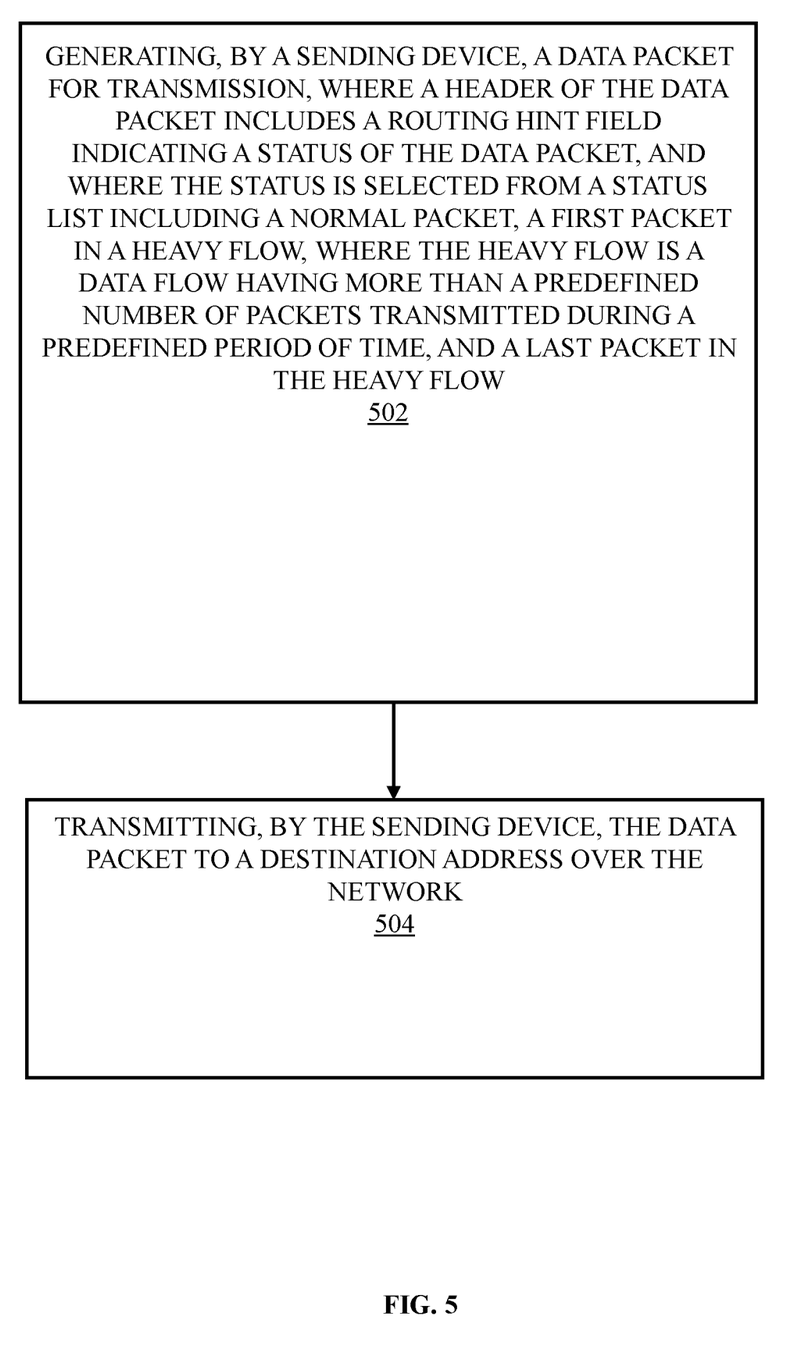
FIG. 5 is a flow diagram that illustrates a method for data transmission over a network in accordance with an implementation of the disclosure.

FIG. 5 is a flow diagram that illustrates a method for data transmission over a network in accordance with an implementation of the disclosure. At a step 502, a data packet is generated for transmission by a sending device. The data packet includes a header that includes a routing hint field indicating a status of the data packet. The status is selected from a status list including a normal packet, a first packet in a heavy flow, where the heavy flow is a data flow having more than a predefined number of packets transmitted during a predefined period of time, and a last packet in the heavy flow. At a step 504, the data packet is transmitted to a destination address over the network by the sending device.

The method provides information about a heavy flow using the routing hint field and enables a routing decision to route the heavy flow, thereby improving the performance of the network by utilizing available resources efficiently. The method enables to improve bandwidth utilization of the network.

Optionally, the status list further includes an independent packet, where the independent packet is not part of a data flow.

Optionally, the routing hint field includes a two-bit code configured to indicate one of four routing statuses. Optionally, the routing hint field includes a three-bit code, and the status list includes one or more additional statuses indicating a length of the heavy flow. Optionally, the code in the routing hint field may include more than three-bits, to provide additional statuses as required.

Optionally, transmitting includes re-routing the data packet using a network multiplexer, by (i) receiving, by the network multiplexer, the data packet from the sending device, (ii) checking, by the network multiplexer, the routing hint field of the data packet; and transmitting, by the network multiplexer, the data packet based on the status.

The independent packet of the status list is identified by the sending device. The sending device may assign the routing hint field for the independent packet. The network multiplexer determines a current least short path for the independent packet. The network multiplexer routes the data flow intelligently even when there is a single data packet, thereby enabling efficient bandwidth utilization of the network.

Optionally, transmitting the data packet by the network multiplexer includes, if the data packet is a normal packet, checking a routing cache to determine if there is a routing entry for a flow corresponding to the data packet. If the routing cache includes a routing entry for the flow, the data packet is transmitted based on the routing entry. If the routing cache does not include a routing entry for the flow, the data packet is transmitted based on a default path (for example, the one found in an equal cost multiple paths, ECMP table). If the data packet is the first packet in a heavy flow, it is determined whether to transmit the data packet based on the default path or on an alternative path and, if the data packet is transmitted based on the alternative path, a new entry is created for the heavy flow in the routing cache. If the data packet is the last packet in the heavy flow, a corresponding entry is deleted for the heavy flow in the routing cache.

Optionally, if the packet is an independent packet which is not part of a data flow, transmitting the data packet by the network multiplexer includes determining a current least used path and transmitting the data packet based on the determination.

A computer-readable medium including instructions which, when executed by a processor, cause the processor to execute the method.

Figure 6:
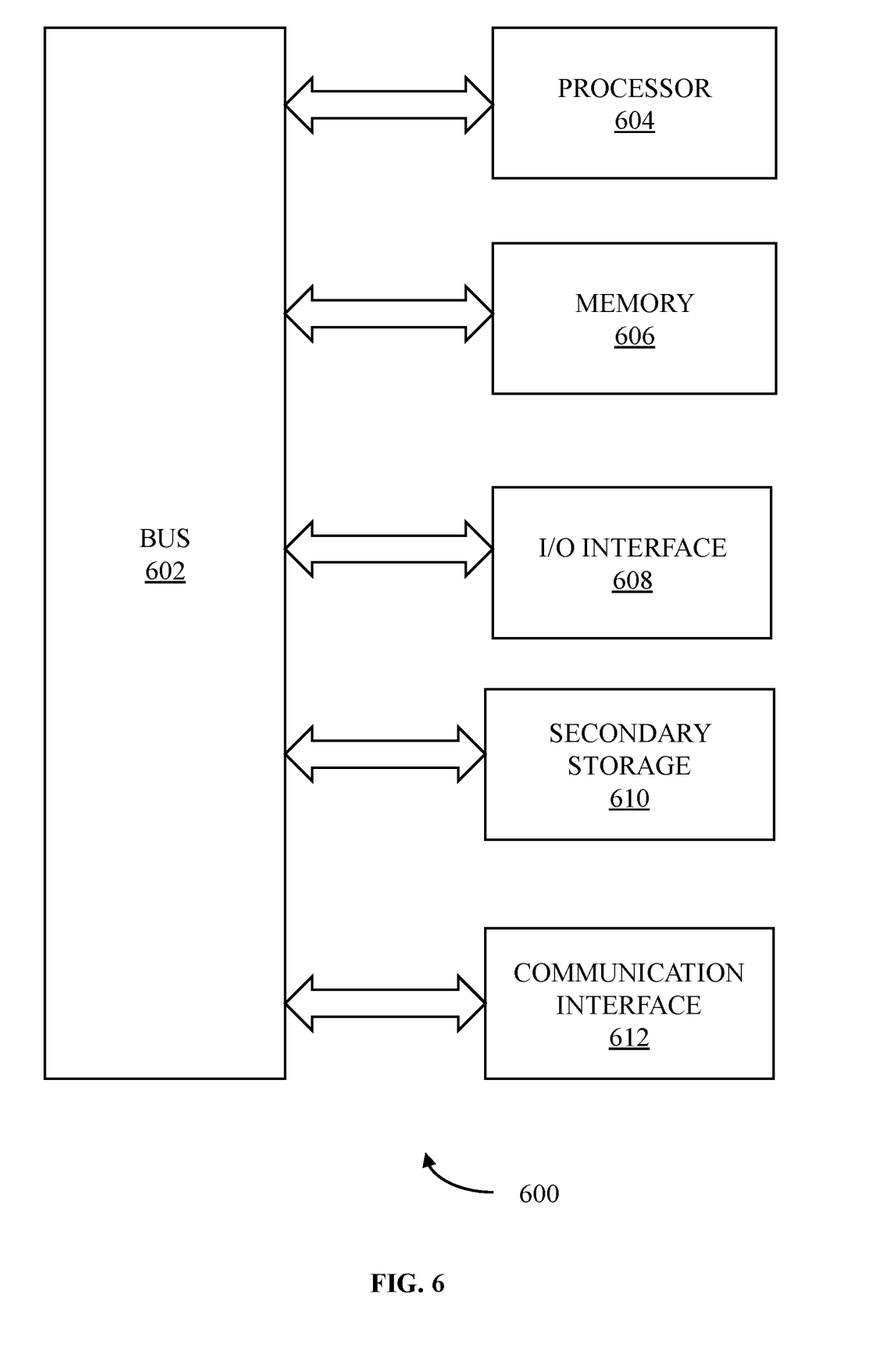
FIG. 6 is an illustration of a computing arrangement that is used in accordance with implementations of the disclosure.

FIG. 6 is an illustration of an exemplary computing arrangement 600 in which the various architectures and functionalities of the various previous implementations may be implemented. As shown, the computing arrangement 600 includes at least one processor 604 that is connected to a bus 602, wherein the computing arrangement 600 may be implemented using any suitable protocol, such as PCI (Peripheral Component Interconnect), PCI-Express, AGP (Accelerated Graphics Port), HyperTransport, or any other bus or point-to-point communication protocol (s). The computing arrangement 600 also includes a memory 606.

Control logic (software) and data are stored in the memory 606 which may take the form of random-access memory (RAM). In the present description, a single semiconductor platform may refer to a sole unitary semiconductor-based integrated circuit or chip. It should be noted that the term single semiconductor platform may also refer to multi-chip modules with increased connectivity which simulate on-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The computing arrangement 600 may also include a secondary storage 610. The secondary storage 610 includes, for example, a hard disk drive and a removable storage drive, representing a floppy disk drive, a magnetic tape drive, a compact disk drive, digital versatile disk (DVD) drive, recording device, universal serial bus (USB) flash memory. The removable storage drive at least one of reads from and writes to a removable storage unit in a well-known manner.

Computer programs, or computer control logic algorithms, may be stored in at least one of the memory 606 and the secondary storage 610. Such computer programs, when executed, enable the computing arrangement 600 to perform various functions as described in the foregoing. The memory 606, the secondary storage 610, and any other storage are possible examples of computer-readable media.

In an implementation, the architectures and functionalities depicted in the various previous figures may be implemented in the context of the processor 604, a graphics processor coupled to a communication interface 612, an integrated circuit (not shown) that is capable of at least a portion of the capabilities of both the processor 604 and a graphics processor, a chipset (i.e., a group of integrated circuits designed to work and sold as a unit for performing related functions, etc.).

Furthermore, the architectures and functionalities depicted in the various previous figures may be implemented in the context of a general computer system, a circuit board system, a game console system dedicated for entertainment purposes, an application-specific system. For example, the computing arrangement 600 may take the form of a desktop computer, a laptop computer, a server, a workstation, a game console, an embedded system.

Furthermore, the computing arrangement 600 may take the form of various other devices including, but not limited to a personal digital assistant (PDA) device, a mobile phone device, a smart phone, a television, etc. Additionally, although not shown, the computing arrangement 600 may be coupled to a network (e.g., a telecommunications network, a local area network (LAN), a wireless network, a wide area network (WAN) such as the Internet, a peer-to-peer network, a cable network, or the like) for communication purposes through an I/O interface 608.

It should be understood that the arrangement of components illustrated in the figures described are exemplary and that other arrangement may be possible. It should also be understood that the various system components (and means) defined by the claims, described below, and illustrated in the various block diagrams represent components in some systems configured according to the subject matter disclosed herein. For example, one or more of these system components (and means) may be realized, in whole or in part, by at least some of the components illustrated in the arrangements illustrated in the described figures.

In addition, while at least one of these components are implemented at least partially as an electronic hardware component, and therefore constitutes a machine, the other components may be implemented in software that when included in an execution environment constitutes a machine, hardware, or a combination of software and hardware.

Although the disclosure and its advantages have been described in detail, it should be understood that various changes, substitutions, and alterations can be made herein without departing from the spirit and scope of the disclosure as defined by the appended claims.

What is claimed is:

1. A method for data transmission over a network; comprising:
    generating, by a sending device, a data packet for transmission, wherein a header of the data packet includes a routing hint field indicating a status of the data packet, and wherein the status is selected from a status list comprising:
        a normal packet,
        a first packet in a heavy flow, wherein the heavy flow is a data flow having more than a predefined number of packets transmitted during a predefined period of time, and a last packet in the heavy flow;
transmitting, by the sending device, the data packet to a destination address over the network, including re-routing the data packet using a network multiplexer;
wherein based on the data packet being the normal packet, a routing cache is checked to determine whether there is a routing entry for a flow corresponding to the data packet;
based on the data packet being the first packet in the heavy flow, it is determined whether to transmit the data packet based on the default path in an equal cost multiple paths (ECMP) table or based on an alternative path in the ECMP table; and
based on the data packet being the last packet in the heavy flow, a corresponding entry for the heavy flow in the routing cache is deleted.

2. The method of claim 1, wherein the status list further comprises an independent packet, wherein the independent packet is not part of a data flow.

3. The method of claim 1, wherein the routing hint field includes a two-bit code configured to indicate one of four statuses.

4. The method of claim 1, wherein the routing hint field includes a three-bit code, and wherein the status list includes one or more additional statuses indicating a length of the heavy flow.

5. The method of claim 1, wherein the re-routing the data packet using the network multiplexer further comprises:
receiving, by the network multiplexer, the data packet from the sending device;
checking, by the network multiplexer, the routing hint field of the data packet; and
transmitting, by the network multiplexer, the data packet based on the status.

6. The method of claim 5, wherein transmitting the data packet by the network multiplexer comprises:
based on the routing cache including a routing entry for the flow, transmitting the data packet based on the routing entry,
based on the routing cache not including a routing entry for the flow, transmitting the data packet based on a default path in the ECMP table,
in response to the data packet being transmitted based on the alternative path in the ECMP table, creating a new entry for the heavy flow in the routing cache.

7. The method of claim 5, wherein based on the packet being an independent packet which is not part of a data flow, transmitting the data packet by the network multiplexer further comprises: determining a current least used path and transmitting the data packet based on the determination.

8. A non-transitory computer-readable medium comprising instructions which, when executed by a processor, cause the processor to execute the method of claim 1.

9. A sending device for transmitting a data packet over a network, wherein the sending device comprises a memory configured to store instructions; and
a processor coupled to the memory and configured to execute the instructions to cause the sending device to:
generate a data packet for transmission, wherein a header of the data packet includes a routing hint field indicating a status of the data packet, and wherein the status is selected from a status list comprising:
a normal packet,
a first packet in a heavy flow, wherein the heavy flow is a data flow having more than a predefined number of packets transmitted during a predefined period of time, and
a last packet in the heavy flow;
transmit the data packet to a destination address over the network, including re-routing the data packet using a network multiplexer;
wherein based on the data packet being the normal packet, a routing cache is checked to determine whether there is a routing entry for a flow corresponding to the data packet;
based on the data packet being the first packet in the heavy flow, it is determined whether to transmit the data packet based on the default path in an equal cost multiple paths (ECMP) table or based on an alternative path in the ECMP table; and
based on the data packet being the last packet in the heavy flow, a corresponding entry for the heavy flow in the routing cache is deleted.

10. The sending device of claim 9, wherein the status list further comprises an independent packet, wherein the independent packet is not part of a data flow.

11. The sending device of claim 9, wherein the routing hint field includes a two-bit code configured to indicate one of four statuses.

12. The sending device of claim 9, wherein the routing hint field includes a three-bit code, and wherein the status list includes one or more additional statuses indicating a length and/or rate of the heavy flow.

13. The sending device of claim 9, wherein the sending device further comprises a network interface card, or the sending device is implemented as a kernel or application on a processing apparatus.

14. A system for transmitting a data packet over a network, comprising a sending device and a network multiplexer, wherein:
the sending device comprises a memory configured to store instructions; and a processor coupled to the memory and configured to execute the instructions to cause the sending device to:
generate a data packet for transmission, wherein a header of the data packet includes a routing hint field indicating a status of the data packet, and wherein the status is selected from a status list comprising:
a normal packet,
a first packet in a heavy flow, wherein the heavy flow is a data flow having more than a predefined number of packets transmitted during a predefined period of time, and
a last packet in the heavy flow;
transmit the data packet to a destination address over the network;
a network multiplexer is configured to:
receive the data packet from the sending device;
check the routing hint field of the data packet;
transmit the data packet based on the status; and
wherein the transmitting the data packet to the destination address over the network includes re-routing the data packet using the network multiplexer;
wherein based on the data packet being the normal packet, a routing cache is checked to determine whether there is a routing entry for a flow corresponding to the data packet;
based on the data packet being the first packet in the heavy flow, it is determined whether to transmit the data packet based on the default path in an equal cost multiple paths (ECMP) table or based on an alternative path in the ECMP table; and based on the data packet being the last packet in the heavy flow, a corresponding entry for the heavy flow in the routing cache is deleted.

15. The system of claim 14, wherein the transmitting the data packet by the network multiplexer further comprises:
- based on the routing cache including a routing entry for the flow, transmitting the data packet based on the routing entry, and
- based on the routing cache not including a routing entry for the flow, transmitting the data packet based on a default path in the ECMP table, and
- in response to the data packet being transmitted based on the alternative path in the ECMP table, creating a new entry for the heavy flow in the routing cache.

16. The system of claim 14, wherein based on the packet being an independent packet which is not part of a data flow, transmitting the data packet by the network multiplexer further comprises: determining a current least used shortest path and transmitting the data packet based on the determination.

17. The system of claim 14, wherein the status list further comprises an independent packet, wherein the independent packet is not part of a data flow.

18. The system of claim 14, wherein the routing hint field includes a two-bit code configured to indicate one of four statuses.

19. The system of claim 14, wherein the routing hint field includes a three-bit code, and wherein the status list includes one or more additional statuses indicating a length of the heavy flow.

20. The system of claim 14, wherein the sending device further comprises a network interface card, or the sending device is implemented as a kernel or application on a processing apparatus.

* * * * *